United States Patent [19]

Schaefer

[11] 4,297,627
[45] Oct. 27, 1981

[54] ELECTRIC MOTOR CONSTRUCTION
[75] Inventor: Edward J. Schaefer, Bluffton, Ind.
[73] Assignee: Franklin Electric Co., Inc., Bluffton, Ind.
[21] Appl. No.: 958,534
[22] Filed: Nov. 7, 1978

Related U.S. Application Data

[63] Continuation-in-part of Ser. No. 896,768, Apr. 17, 1978, abandoned.

[51] Int. Cl.³ .......................... H02P 1/26; H02P 7/36; H02P 1/42; H02K 11/00
[52] U.S. Cl. .................................. 318/778; 318/785; 310/71
[58] Field of Search ............... 318/778, 781, 784, 785, 318/786–794; 310/71, 72

[56] References Cited
U.S. PATENT DOCUMENTS 2,642,976  6/1953  Roggenstein ............... 318/793
3,248,582  4/1966  Brown .......................... 310/71

Primary Examiner—S. J. Witkowski
Assistant Examiner—John B. Conklin
Attorney, Agent, or Firm—Merriam, Marshall & Bicknell

[57] ABSTRACT

This disclosure deals with single phase AC electric motors. The motor includes run and start windings, a start winding cutout switch connected in series with the start winding, and an electrical connector. Different power supply arrangements are provided which couple with the connector. One arrangement includes a power supply cable which supplies power and a jumper attachment which connects the start and run windings in parallel, thus causing the motor to operate as a split phase motor. In another arrangement, a cable supplies power and a capacitor attachment is provided for connecting the start winding to a start capacitor, thus causing the motor to operate as a capacitor start motor. The motor may be constructed to receive the attachments at either end of the motor.

27 Claims, 12 Drawing Figures

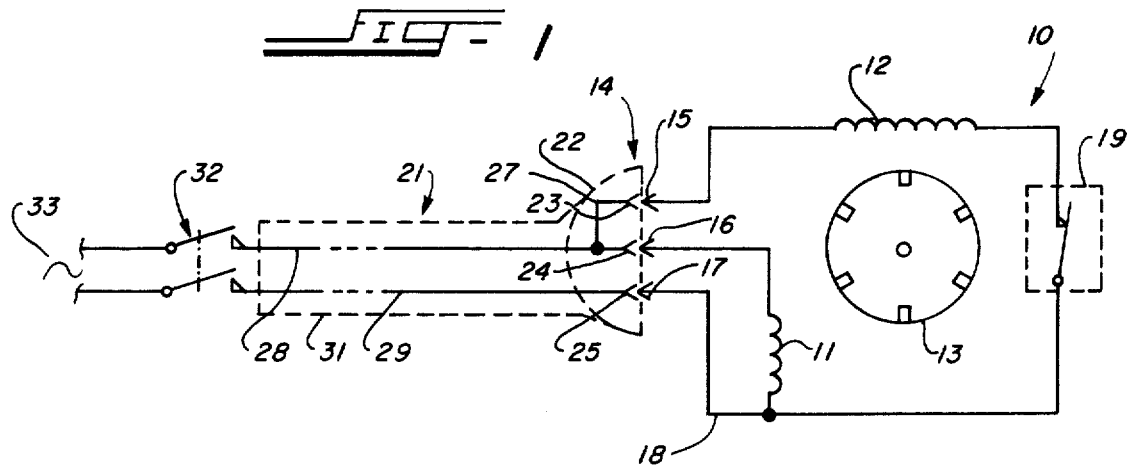
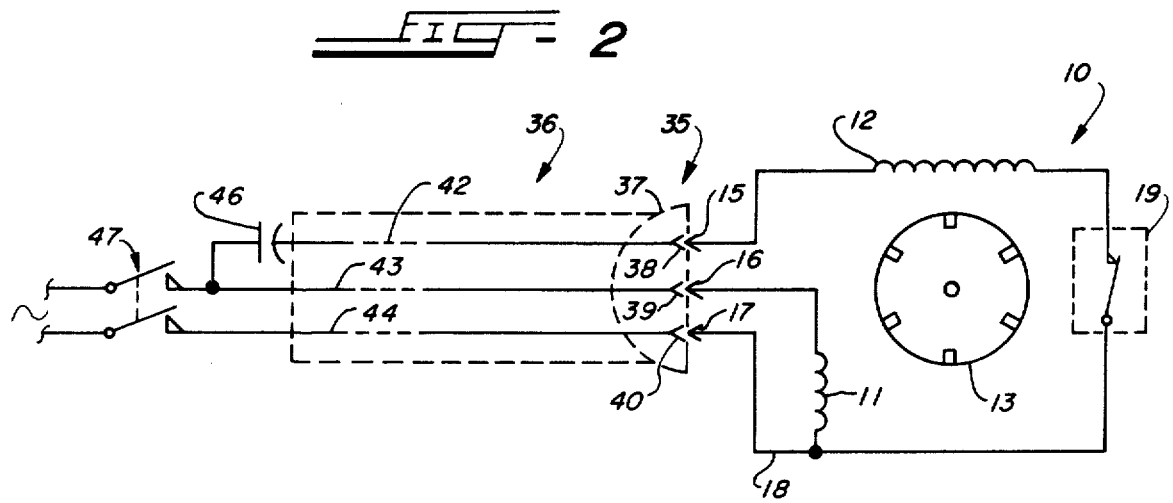
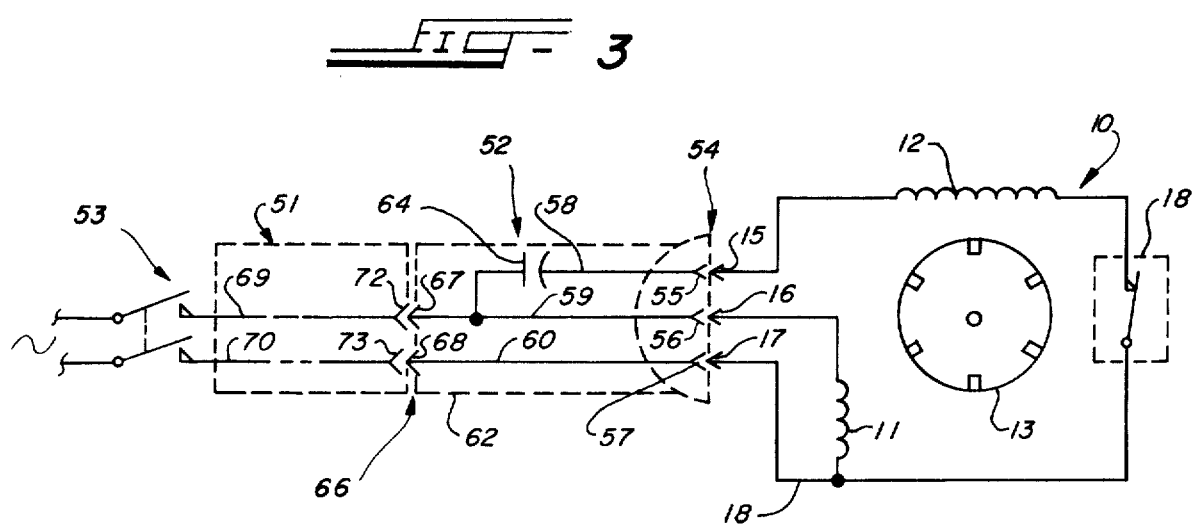

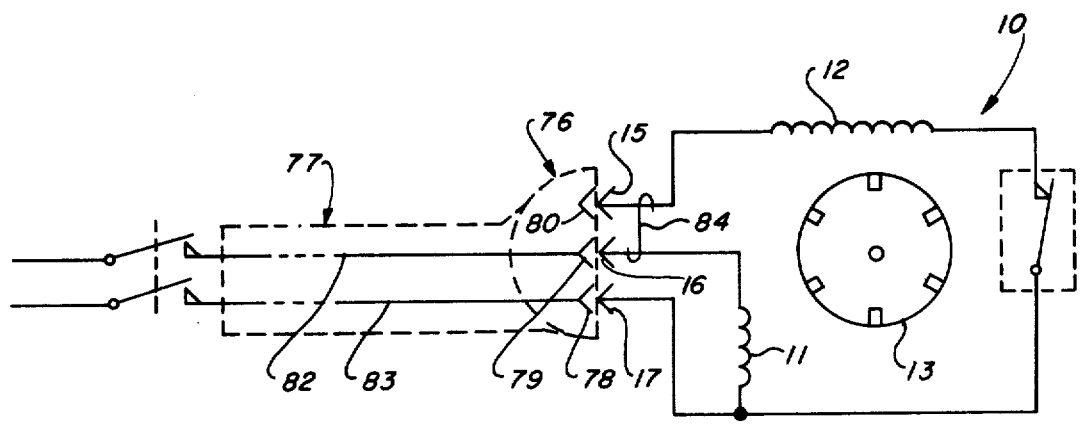
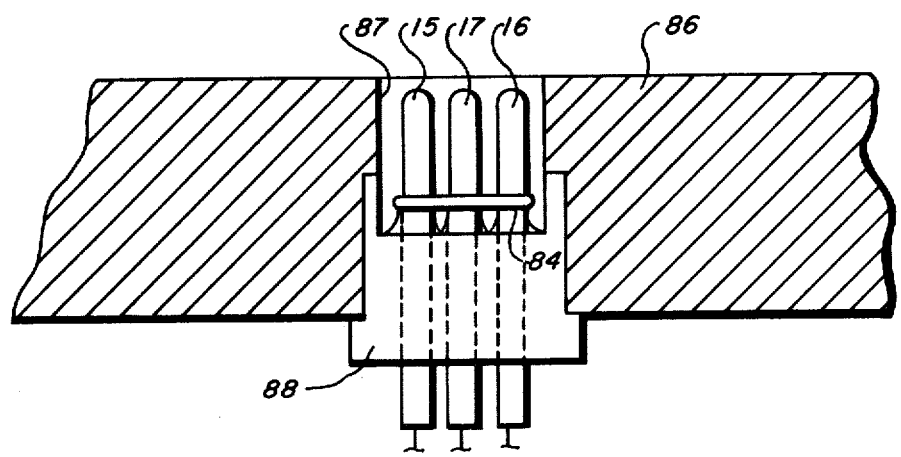
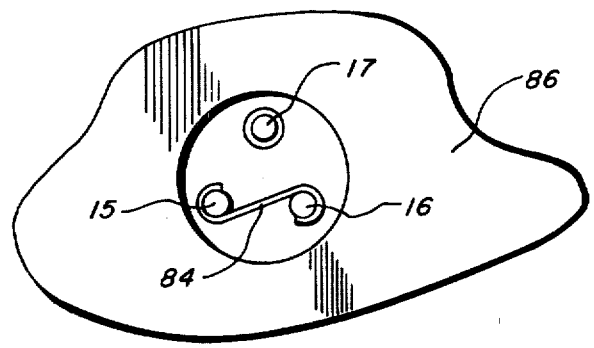

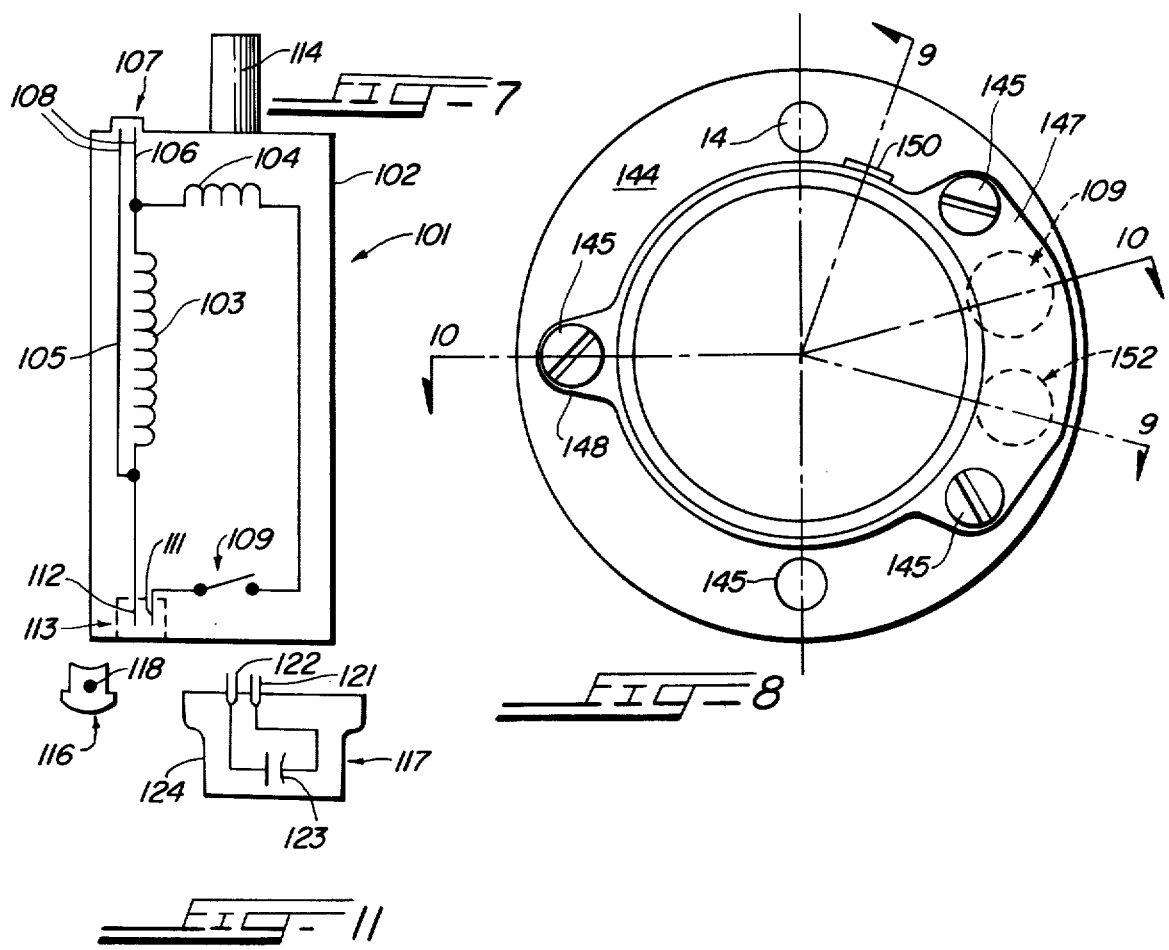
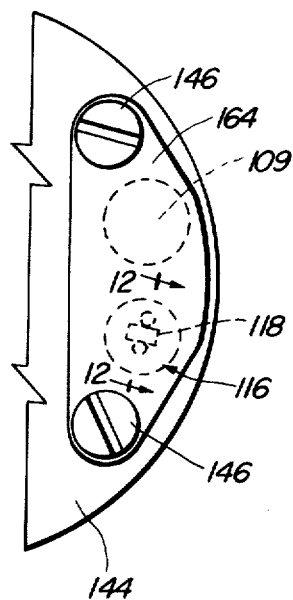
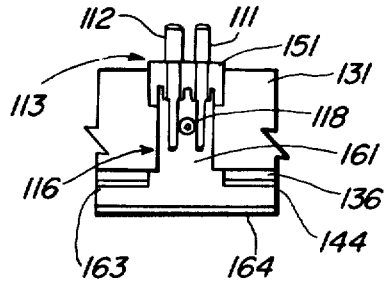

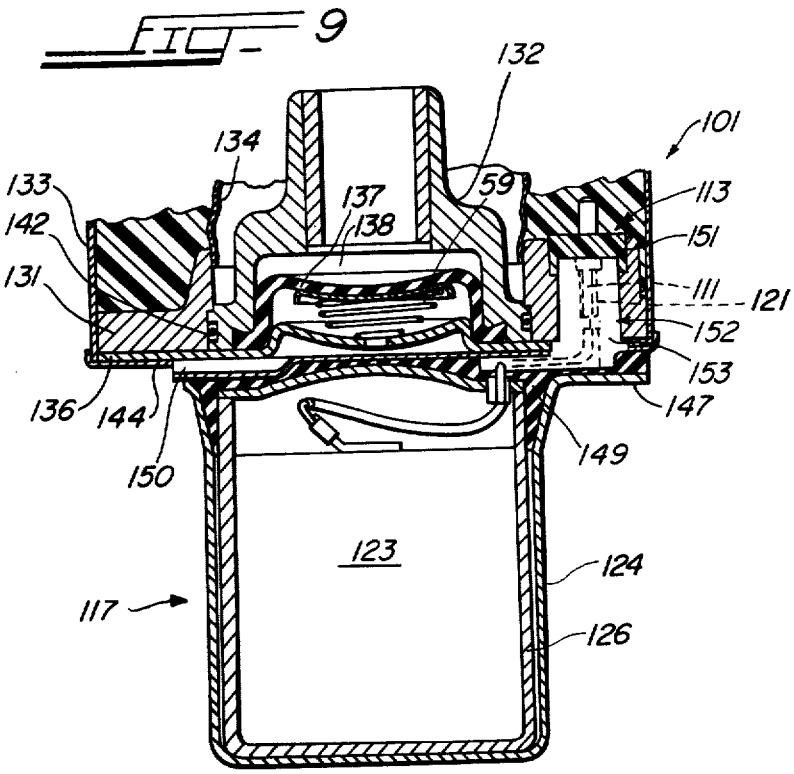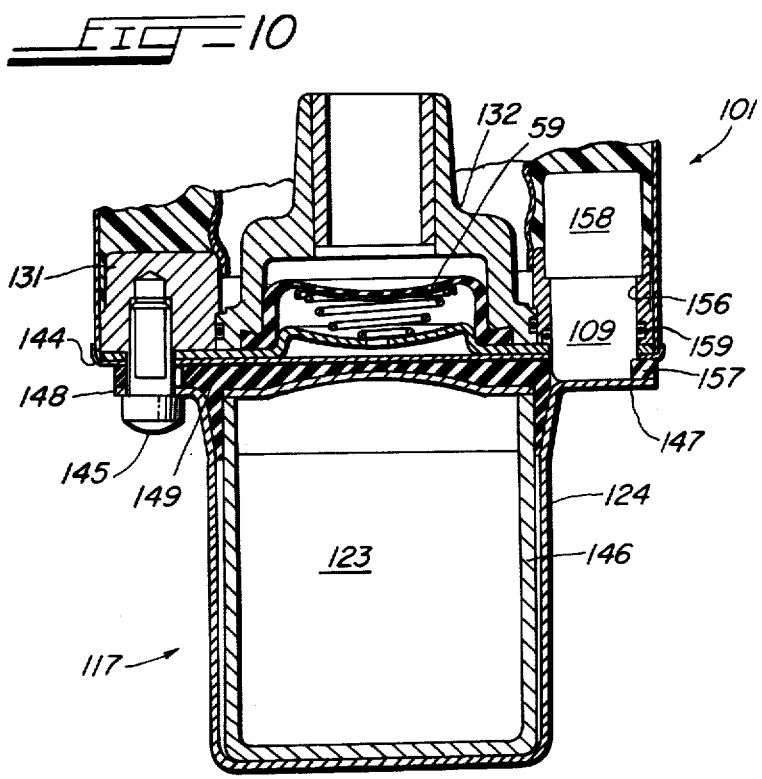

ELECTRIC MOTOR CONSTRUCTION

This application is a continuation-in-part of E. J. Schaefer application U.S. Ser. No. 896,768 filed Apr. 17, 1968 now abandoned.

Two well known types of single phase AC electric motors in common use are known as the capacitor start motor and the split phase motor. The capacitor start motor is normally used where relatively high starting torque is required, and the split phase motor is normally used in low and medium starting torque applications.

In an application where a motor is coupled to drive a pump in a well, for example, the capacitor start motor usually has a three-wire power cable running from the motor to the surface, and the capacitor is located at the surface. The split phase motor on the other hand is connected by a two-wire cable to the power supply at the surface. The split phase motor is less expensive to manufacture and to install, and for this reason this type has gradually been gaining in commercial importance.

A disadvantage of the foregoing arrangement is that in the past, two different motor constructions have been required, a split phase type designed to receive a two-wire cable and a capacitor start type designed to receive a three-wire cable.

It is a general object of this invention to provide an improved electric motor, power supply and attachments, wherein the motor is usable as either a capacitor start motor or as a split phase motor.

Apparatus in accordance with this invention comprises a motor including a start winding, a run winding, a start winding cutout switch, and a cable connector for connecting the motor windings to a power cable. The apparatus further includes exchangeable attachments to the motor windings for making the motor operate as either a capacitor start or as a split phase motor. The atttachments may be part of the connector and the cable, or they may be located separately from the connector.

To operate the motor as a split phase type, an attachment is employed including a conductor or jumper which forms a short circuit connection between the run and start windings.

To operate the motor as a capacitor start motor, an attachment is employed including a capacitor which may be fastened to or displaced from the motor.

The foregoing and other objects and advantages of the present invention will become more apparent from the following detailed description taken in conjunction with the accompanying figures of the drawings, wherein:

FIG. 1 is a schematic diagram of an electric motor incorporating the present invention;

FIG. 2 is a schematic diagram similar to FIG. 1 but showing a different arrangement;

FIG. 3 is a diagram similar to FIG. 2 but illustrating an alternate form of the invention;

FIG. 4 is a schematic diagram similar to FIG. 1 but illustrating another alternate form of the invention;

FIGS. 5 and 6 illustrate a physical embodiment of the form of the invention shown schematically in FIG. 4;

FIG. 7 is a schematic diagram of a motor illustrating a preferred form of the invention;

FIG. 8 is a view of a motor according to FIG. 7 and including a capacitor start attachment;

FIGS. 9 and 10 are sectional views taken on the lines 9—9 and 10—10 of FIG. 8;

FIG. 11 is a view of a motor according to FIG. 7 and including a split phase attachment; and FIG. 12 is a sectional view taken on the line 12—12 of FIG. 11.

The apparatus illustrated in FIG. 1 comprises an electric motor 10 including a run winding 11, a start winding 12 and a rotor 13. The windings 11 and 12 are wound on the motor stator and are angularly displaced, in accordance with well known conventional practice. The motor 10 further includes a plug part of an electrical connector 14, the plug part including three contacts which are preferably prongs 15, 16 and 17. The prong 15 is connected to one side of the start winding 12, the prong 16 is connected to one side of the run winding 11, and the prong 17 is connected to a common wire 18 which connects with the other sides of both the start winding 12 and the run winding 11. A start winding cutout switch 19 is connected between the start winding 12 and the common wire 18. While the start winding cutout switch 19 may be conventional, it preferably is constructed as illustrated and described in U.S. patent application Ser. No. 770,110, filed Feb. 18, 1977.

The apparatus illustrated in FIG. 1 further includes a power cable 21 which terminates in a socket part 22 of the above mentioned electrical connector 14. The socket part 22 includes three contacts which are preferably sockets 23, 24 and 25 which respectively connect with the three prongs 15, 16 and 17. The connector includes an attachment for connecting the motor 10 to operate as a split phase AC motor, and the attachment includes a short circuit or bridge conductor 27 in the socket part 22 between the sockets 23 and 24. The cable 21 further includes two wires 28 and 29 which are electrically connected to the bridge conductor 27 and to the socket 25 which leads to the common wire 18. The dashed lines indicated by the reference numeral 31 represent a layer of insulation which surrounds the wires 28 and 29, the bridge conductor 27 and the sockets 23, 24 and 25, the sockets however being exposed so that they can make connection with the prongs 15, 16 and 17. At the other end of the cable 21, opposite from the connector 14, the wires 28 and 29 are connected to a two pole electric switch 32 which, when closed, connects the wires 28 and 29 to a single phase AC power supply 33.

The motor 10, connected as illustrated in FIG. 1, will operate as a split phase motor as mentioned above. Assuming that the switch 32 is open and that the rotor 13 is at stand still, the start winding cutout switch 19 will be closed as shown in the drawings. Wnen the switch 32 is closed to energize the motor 10, the AC line voltage will appear across the socket 25 and the bridge conductor 27. Since the switch 19 is initially closed, the AC voltage will appear across the parallel connection of the start winding 12 and the run winding 11, and the rotor 13 will start to rotate and drive a device such as a pump (not shown). After the motor has started, the start winding cutout switch 19 automatically opens and disconnects the start winding 12 from the AC power supply, but of course the rotor 13 continues to turn and drive the device until the switch 32 is subsequently opened.

FIG. 2 illustrates the same electric motor 10 but with a different attachment for connecting the motor for operation as a capacitor start motor. The apparatus illustrated in FIG. 2 includes the motor 10 and a power cable 36 which terminates in a part 37 of a connector 35. The connector part 37 includes three sockets 38, 39 and 40, and the cable 36 includes three wires 42, 43 and 44 which are electrically connected to the three sockets 38, 39 and 40, respectively. A start capacitor 46 is connected between the wires 42 and 43 at the other end of the cable 36, and a two pole switch 47 is connected between an AC power supply and the two wires 43 and 44.

Assuming that the switch 47 is initially open, the start winding cutout switch 19 is closed and the rotor 13 is stationary. Since the capacitor 46 is connected in series with the start winding 12, when the switch 47 is closed the motor will develop starting torque and the rotor 13 will rotate, and the motor will operate as a conventional capacitor start motor.

It will be apparent from the foregoing that a single motor 10, without a change in construction, may be made to operate either as a split phase motor or as a capacitor start motor. For operation as a split phase motor, the cable 21 shown in FIG. 1 is employed which, due to the attachment of the bridge conductor 27, connects the start winding 12 in parallel with the run winding 11. On the other hand, for operation as a capacitor start motor the cable 36 is used. When using the cable 36, the start winding 12 is connected by the cable to the attachment including the capacitor 46, and the motor 10 will operate as a capacitor start motor.

The arrangement shown in FIG. 3 illustrates that the inventive concept may also be applied to an arrangement where the capacitor attachment of the capacitor start motor is not located a substantial distance from the motor but instead is located relatively close to the motor. With reference to FIG. 3, the motor 10 is connected by a two-wire cable 51 and by a short cable section 52 to a two-pole switch 53 which connects the motor 10 to a source of AC power. The motor 10 includes the three prongs 15, 16 and 17 of the plug part of a connector 54, and the cable section 52 includes three sockets 55, 56 and 57 of a socket part of a connector 54. The cable section 52 further includes three wires 58, 59 and 60 which are respectively connected to the three sockets 55, 56 and 57, and a layer of insulation 62 surrounds the wires 58, 59 and 60 located in the cable section 52, relatively close to the motor 10, is a capacitor 64 which is connected to the wire 58 that is electrically connected to the start winding 12 of the motor 10. The wire 59, which is electrically connected to the run winding 11, is connected to the other side of the capacitor 64. At the end of the cable section 52 which is displaced from the motor 10 is a plug part of a connector 66. The plug part includes prongs 67 and 68 which are attached to the cable section 52. The cable 51 includes two wires 69 and 70 and two sockets 72 and 73 which are connected to the wires 69 and 70. The sockets 72 and 73 connect with the prongs 67 and 68, respectively. At their other ends, the wires 69 and 70 connect with the two pole switch 53.

The circuit arrangement shown in FIG. 3 is of course electrically identical with the arrangement shown in FIG. 2. The difference, however, is that the capacitor 64 is physically located in a short cable section 52 which is relatively close to the motor 10, and a main two wire cable 51 connects the short cable section 52 with the power supply. The arrangement shown in FIG. 3 may be employed in an application where it is desired to have the capacitor relatively close to the motor 10 but where the power supply outlet is removed from the motor.

As described, FIG. 1 illustrates a split phase attachment where the connector part 22 that is on the power cable 21, has a bridge conductor 27, or jumper, installed therein. FIGS. 4 to 6 illustrate an attachment where a jumper or bridge is on the connector part of the motor.

The electric motor 10 again includes windings 11 and 12, a rotor 13, and prongs 15, 16 and 17 of a motor part of an electrical connector. The connector further includes a cable part 76 which forms a termination of a power supply cable 77. The part 77 includes sockets 78, 79 and 80 which respectively receive the prongs 15, 16 and 17 but the cable has only two wires 82 and 83 and they connect with the sockets 78 and 79. A bridge conductor or jumper 84 is fastened to and electrically connects the prongs 15 and 16, and thereby connects the start and run windings in parallel.

With reference to FIGS. 5 and 6, the electric motor 10 includes an end ring 86 having a circular opening 87 formed in it, and an insulating member 88 is secured in the opening 87 and supports the three prongs 15 to 17. The prongs 15 to 17 extend through the support and the lower ends are electrically connected to the windings 11 and 12.

The jumper 84 comprises a relatively stiff piece of electrically conductive material such as copper. The jumper 84 extends between the prongs 15 and 16 and the ends of the jumper are looped around the prongs. The looped ends tightly engage and electrically connect the prongs 15 and 16. As shown in FIG. 5, the jumper 84 is fastened at the lower ends of the prongs and therefore does not interfere with the installation of the cable part of the connector.

FIGS. 7 through 12 illustrate a preferred form of the invention wherein the attachments are provided at the end of the motor which is opposite from the power output end of the motor shaft. This arrangement is advantageous because it permits access to the attachments without interference by a device, such as pump, connected to be driven by the motor. With reference to FIG. 7, the motor 101, which is illustrated schematically, includes an outer shell or casing 102 which encloses a run or main winding 103 and a start winding 104. The run and start winding circuits are connected to a common lead 106 that forms part of a power supply circuit that also includes a two-prong cable connector half 107. The connector 107 includes two prongs 108, one of which is connected to the lead 106 and the other of which is connected to a second power supply circuit lead 105 that is also connected to the run winding 103. The start winding circuit also includes a start winding cutout switch 109. The motor 101 further includes an armature shaft having an external power output end 114 at one end of the motor. In use, a device such as a pump to be driven is fastened to the motor casing 102 at the end adjacent the power output shaft 114 and a two wire power supply cable is connected to the connector half 107.

An electrical gap is formed between the start winding and the power supply circuits by two conductors or prongs 111 and 112 of a connector half 113. This break or gap is connected during use of the motor 101 by either a split phase attachment 116 or by a capacitor start attachment 117, depending upon whether the motor is to be operated in its split phase mode or in its capacitor start mode. The two attachments 116 and 117 are interchangeable and either may be connected to the two-prong connector half 113. When the split phase attachment 116 is used, an electrically conductive bridge or jumper 118 mounted in the body of the attachment 116 extends between and electrically interconnects the two prongs 111 and 112. This jumper 118 thereby electrically connects the start winding circuit directly to the power circuit for operation in the split phase mode. In the event the motor 101 is to be operated as a capacitor start motor, the split phase attachment 116 is removed and the capacitor start attachment 117 is fastened to the motor. The attachment 117 includes two sockets or receptacles 121 and 122 which engage the two prongs 111 and 112. The two sockets 121 and 122 are connected to a start capacitor 123 contained in a housing 124 of the attachment 117. Thus, the start winding 104 is connected in series with the start capacitor 123 and the motor will operate as a capacitor start motor.

FIGS. 8, 9 and 10 illustrate the motor with the capacitor start attachment 117 thereon. With specific references to FIGS. 9 and 10, the lower end of the motor 101 includes a lower end ring 131 which supports a lower bearing housing 132. The motor further includes an outer cylindrical shell 133 and an inner liner 134 which enclose the windings 103 and 104. The lower bearing housing 132 is held in place on the end ring 131 by a pressure equalizer retainer plate 136 that extends across the lower end of the motor stator. The motor is liquid filled and the pressure equalizer mechanism is provided to equalize the internal and external pressures, and comprises the plate 136, a flexible diaphragm 137 that extends across a centrally located opening 138 formed in the lowerside of the bearing housing 132, and a compression spring 139 mounted between the diaphragm 137 and the plate 136. The plate 136 has a centrally located hole 141 formed in it which permits exterior liquid to flow into and out of the space between the plate 136 and the diaphragm 137 and flexing of the diaphragm 137 maintains a pressure equilibrium. The outer rim or edge of the diaphragm 137 is of course sealed to the bearing housing 132 to prevent leakage of the internal liquid. An O-ring 142 seals the connection between the bearing support 132 and the end ring 131. The retainer plate 136 and the entire lower end of the motor is preferably covered by a corrosion resistant outer cover 144 which is fastened to the end ring 131 as by a plurality of screws 145 (FIGS. 8 and 10).

The capacitor 123 is enclosed in the capacitor case 146 and in the housing 124, which protect the capacitor against damage. The outer housing 124 includes radial flanges 147 and 148 which have holes formed in them to receive the fastening screws 145. A resilient rubber sealing member 149 is positioned between the outer surface of the cover 144 and the housing 124 and forms a fluid tight seal between them and around the capacitor. To enable the exterior fluid to reach the hole 141 of the retainer plate 136 of the equalizing mechanism, a channel 150 (FIG. 9) is formed by punching and bending a portion of the cover 144.

The connector half 113 includes a body part 151 (FIG. 9) that is secured in a hole formed in the end ring 131 and which supports the two prongs 111 and 112. The attachment 117 includes another connector half 152 which mates with the connector half 113, the connector half 152 including the sockets 121 and 122 which mate with the prongs 111 and 112. The sockets 121 and 122 are encased in a resilient plug part 153 which forms part of the capacitor start attachment 117. A resilient plug part 153 may be molded as part of the sealing member 149 or it may be separately molded and then vulcanized to it. When the capacitor start attachment 117 is attached to the motor, the plug part 153 of the connector half 152 is pressed into the end ring hole and into engagement with the connector half 113, and the screws 146 hold the parts in place.

With reference to FIGS. 8 and 10, the present specific example of the invention illustrates an arrangement where the start winding cutout switch 109 is mounted at a location where it is accessible from the end of the motor which is opposite from the power output end. A hole 156 is formed in the end ring 131 and an overlying hole 157 is formed in the cover 144. The cutout switch 109 is plugged into a receptacle 158 (FIG. 10) mounted in the hole 156. The hole 156 has an O-ring seal 159 located in it which surrounds the housing of the cutout switch and forms a liquid tight seal. The flange 147 of the housing 124 of the capacitor start attachment 117 extends across the outer end of the cutout switch to hold it in place, and a hole is formed in the seal 149 for the switch housing.

The short circuit attachment 116 is interchangeable with the capacitor start attachment 117 as previously mentioned, and its construction is illustrated in FIGS. 11 and 12. The attachment 116 is in the shape of a plug which may be inserted into the end ring hole and into engagement with the connector half 113. The attachment 116 includes a resilient plug portion 161 which is received in the end ring opening over the connector half 113, and the electrically conductive jumper 118 is fastened to the plug part 161 as by embedding the jumper in it. The jumper 118 in the present instance is a generally cylindrical conductor having a diameter which causes it to fit tightly between the two prongs 111 and 112, as shown in FIGS. 11 and 12. Thus, when the plug part 161 is inserted into the connector half 113, the prongs 111 and 112 extend into holes formed in the plug part 161 and the jumper 118 bridges the gap formed between the prongs 111 and 112, and thus connects the start winding circuit directly to the power supply circuit.

As previously mentioned, the retainer plate 136 and the cover 144 have openings formed therein which overlie the connector half 113, and the plug part 161 extends through these holes as shown in FIG. 12. A generally flat seal part 163 is formed at the outer end of the plug 161 and extends across the outer surface of the cover 144. The seal part 163 has a hole formed in it that extends around the cutout switch 109. An outer cover plate 164 is positioned over the seal part 163 and two of the screws 146 hold the assembly in place. The outer plate also of course extends across the outer surface of the cutout switch 109. The seal 163 also preferably extends to and around the two mounting screws 146.

It will be apparent from the foregoing that a new and useful electric motor construction has been provided. A single motor design may be provided which is usable as either a capacitor start motor or as a split phase winding motor. This of course makes it unnecessary for a manufacturer to make and stock more than one motor design. The manufacturer may supply a single motor design and interchangeable attachments and power supply arrangements for converting the motor for use as either a split phase or as a capacitor start motor. Connections to the power and the winding circuits are accessible externally of the motor housing so that the attachments may be readily connected to the motor circuits. Further, the attachments are preferably provided at the end of the motor which is opposite from the power output end of the shaft so that the attachments may be connected to or exchanged without interference from a mechanism, such as a pump, connected to be driven by the motor. In addition, the attachments may be connected without interfering with the other working parts of the motor or causing a loss of the internal fluid which normally fills the motor. For example, either one of the two attachments 116 and 117 may be connected to the motor 101 utilizing the screws 146, without interfering with the mounting of the lower bearing support 132 or causing a loss of the motor fluid.

I claim:

1. In combination, an electric motor operable as a split phase or as a capacitor start motor, comprising an outer casing, a run winding circuit, a start winding circuit including a start winding cutout switch, said run and start winding circuits being mounted within said casing, power circuit means adapted to connect said start and run winding circuits to a power supply, said start winding and power circuits having an electrical gap formed therebetween, and removable interchangeable attachment means exterior of said casing and connectable to bridge said gap, one of said attachment means causing said motor to operate as a capacitor start motor and another if said attachment means causing said motor to operate as a split phase motor.

2. The combination of claim 1, wherein said attachment means comprises a jumper for connecting said start winding and power circuits for operation of the motor as a split phase motor.

3. The combination of claim 1, wherein said attachment means comprises a capacitor for connecting said start winding and power circuits for operation as a capacitor start motor.

4. The combination of claim 1, wherein said motor further includes an outer casing, a first connector half accessible exteriorly of said casing and including spaced electrical connectors forming said gap, said first conductors half receiving said attachment means.

5. The combination of claim 4, wherein said first connector half includes at least two prongs, and said attachment means being fastened to said casing and including a jumper connected between said prongs.

6. The combination of claim 5, wherein said attachment comprises a plug having said jumper therein.

7. The combination of claim 5, wherein said attachment comprises said capacitor, means for securing said capacitor to said casing, and a second connector half fastened to said capacitor and matable with said first connector half.

8. The combination of claim 4, wherein said attachment means includes a second connector half adapted to mate with said first connector half.

9. The combination of claim 8, and further including a power supply cable for connecting said motor to a power supply, and said second connector half forms a termination of said cable.

10. The combination of claim 1, and further including a housing containing said circuits, power supply connector means adjacent one end of said housing, and means adjacent another end of said housing for securing said attachment.

11. The combination of an electric motor including an outer casing, a run winding circuit and a start winding circuit in said casing, power circuit means adapted to connect said start and run winding circuits to a power supply, a start winding cutout switch connected in said start winding circuit, said start winding and power circuits having an electrical gap formed therebetween and said gap being accessible externally of said casing, connector means fastened to said housing and including at least two spaced conductors, said gap being formed by said spaced conductors, and removable attachment means external of said casing and connected to said spaced conductors for bridging said gap.

12. The combination of claim 11, wherein said attachment means comprises split phase means including a jumper, and capacitor start means including a capacitor, said split phase means and said capacitor start means being interchangeable.

13. The combination of claim 11, wherein said motor further includes a power cable connector, said connector means and said cable connector being separated.

14. The combination of claim 11, wherein said motor further includes a power cable and a power cable connector, and said connector means and said attachment means form part of said power cable and said power cable connector.

15. The combination comprising:
 (a) an electric motor including a run winding, a start winding, a cutout switch connected to the start winding, an electric connector, and a common wire which is connected to the start winding and to the cutout switch;
 (b) a motor part of said electric connector including three contacts, one contact being connected to said run winding, one contact being connected to said start winding, and said common wire being connected to the third contact;
 (c) a power supply cable including a cable part of said electric connector, said cable part including three contacts which connect with said three contacts of said motor part of said connector; and
 (d) and means in said cable electrically connecting said contact for said start winding with one other of said contacts.

16. The combination specified in claim 15, wherein said means comprises a jumper connection between two contacts of said cable part.

17. The combination specified in claim 16, wherein said jumper connection is in said cable part of said connector.

18. The combination specified in claim 15, wherein said means comprises a capacitor electrically connected between two contacts of said cable part.

19. The combination specified in claim 18, wherein said cable includes three wires and said capacitor is connected between two of the wires.

20. The combination specified in claim 19, and further including a two wire cable connected to said three wire cable.

21. The combination comprising:
 (a) an electric motor including a run winding, a start winding, a cutout switch connected to the start winding, an electric connector and a common wire which is connected to the start winding and to the cutout switch;
 (b) a motor part of said electric connector including three contacts, one contact being connected to said start winding, and said common wire being connected to the third contact;
 (c) a power supply cable including a cable part of said electric connector, said cable part including three contacts which connect with said three contacts of said motor part of said connector; and
 (d) said cable part of said electric connector further including a bridge conductor which connects the contacts which are electrically connected to said start winding and to said run winding.

22. The combination comprising:
(a) an electric motor including a run winding, a start winding, a cutout switch connected to the start winding, an electric connector and a common wire which is connected to the start winding and to the cutout switch;
(b) a motor part of said electric connector including three contacts, one contact being connected to said run winding, one contact being connected to said start winding, and said common wire being connected to said run winding and to said cutout switch;
(c) a first power supply cable design including a cable part of an electric connector, said cable part including three contacts which mate with said three contacts of said motor part of said connector, a bridge conductor connected to two of said three contacts and connecting said start and run windings in parallel, and two wires for connecting said bridge conductor and the third contact to an AC power supply;
(d) a second power supply cable design including a cable part of an electric connector, said cable part including three contacts which mate with said three contacts of said motor part of said connector, three wires connected to said three contacts, and a capacitor connected between two of the three wires,
(e) said connector cable parts of said first and second power supply cable designs having the same size and being interchangeable so that said motor is useable with either of said designs.

23. An electric motor comprising a run winding circuit, a start winding circuit, power circuit means adapted to connect said start and run winding circuits to a power supply, said start winding and power circuit having an electrical gap formed therebetween, a pair of spaced conductors accessible externally of said motor and forming said gap, and electrical jumper means removably attached to said motor and engageable with said spaced conductors for making said motor operable as a split phase motor.

24. A motor according to claim 23, and further including a capacitor attachment means adapted to be connected to said conductors.

25. The combination of claim 4, wherein said start winding cutout switch is accessible externally of said outer casing.

26. The combination of claim 10, wherein said start winding switch is accessible externally of said housing.

27. The combination of claim 11, wherein said start winding cutout switch is accessible externally of said casing.

* * * * *